(12) United States Patent
Toyooka

(10) Patent No.: US 6,972,813 B1
(45) Date of Patent: Dec. 6, 2005

(54) OPTICAL LAMINATED BODIES, LIGHTING EQUIPMENT AND AREA LUMINESCENCE EQUIPMENT

(75) Inventor: Kazuhiko Toyooka, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 298 days.

(21) Appl. No.: 09/980,911

(22) PCT Filed: Jun. 8, 2000

(86) PCT No.: PCT/US00/15791

§ 371 (c)(1),
(2), (4) Date: Nov. 8, 2001

(87) PCT Pub. No.: WO00/75560

PCT Pub. Date: Dec. 14, 2000

(30) Foreign Application Priority Data

Jun. 9, 1999 (JP) .................................. 11-162181

(51) Int. Cl.⁷ .......................................... G02F 1/1335

(52) U.S. Cl. ........................... 349/96; 349/62; 349/112
(58) Field of Search ........................... 349/62, 96, 112, 349/115, 175

(56) References Cited

U.S. PATENT DOCUMENTS 5,587,816 A * 12/1996 Gunjima et al. .............. 349/62
6,208,466 B1 * 3/2001 Liu et al. ..................... 359/584

FOREIGN PATENT DOCUMENTS

EP 0 545 701 A1 6/1993 .......... G02F 1/1335
EP 0 787 942 A2 6/1997 ............. F21V 8/00

* cited by examiner

*Primary Examiner*—Tarifur R. Chowdhury
*Assistant Examiner*—Hoan Chau Nguyen
(74) *Attorney, Agent, or Firm*—Anna A. Kobilansky

(57) ABSTRACT

Lighting devices are disclosed that include optical laminated bodies. An exemplary optical laminated body includes a polarizing layer, a first transparent film disposed closely to a front surface of the polarizing layer and a second transparent film disposed closely to a back surface of the polarizing layer. The polarizing layer includes a reflective polarizing film, and both of the first transparent film and the second transparent film are diffusive films. The lighting devices further include a light source supplying light to the optical laminated body through a light entry surface of the first transparent film of the optical laminated body and a lens film disposed between the light source and the optical laminated body. The lighting device provides diffused-polarized light emitted from a light emitting surface of the second transparent film of the laminated body.

4 Claims, 1 Drawing Sheet

OPTICAL LAMINATED BODIES, LIGHTING EQUIPMENT AND AREA LUMINESCENCE EQUIPMENT

FIELD OF THE INVENTION

The present invention relates to area luminescence equipment such as light display equipment and also relates to lighting equipment such as back light equipment including back light equipment made of an optical laminated body, used for forming such area luminescence equipment. In other aspects, the invention relates to brightness-increasing films for improving the brightness of the area luminescence equipment in, for example, liquid display equipment.

BACKGROUND OF THE INVENTION

So-called brightness-increasing films improve the brightness of area luminescence equipment such as liquid display equipment. FIG. 1 shows one example of such an area luminescence equipment.

In the example shown in FIG. 1, light from a surface light source 91 is supplied to a lower diffusive plate 92 through an air layer 94-1, and light transmitted to the lower diffusive plate 92 is diffused/emitted and then supplied to an optical film 93 through an air layer 94-2. Light supplied to the optical film 93 penetrates the optical film 93 and transmitted light is directly supplied to an upper diffusive plate 96 through an air layer 94-3, diffused/emitted and then supplied to an illuminating body 97 (liquid crystal display panel) through an air layer 94-4. The phrase "through the air layer" means that adjacent parts (e.g., surface light source and lower diffusive plate, etc.) are not optically closely contacted.

When constructions such as shown by FIG. 1 include a large number of parts, manufacturing operations can become complicated. In the optical system composed of a combination of these parts, since the area of the optical surface increases (an interface between the surface of parts and an air layer), the optical loss by surface reflection on the optical surface increases and the light transmitting efficiency is lowered. Therefore, it can be difficult to improve the brightness of the area luminescence equipment.

The present invention provides an optical laminated body which can reduce the number of parts, and thereby simplify operation and production of the optical laminated body, and minimize the number of optical surfaces of the optical system, thereby preventing optical loss by interfacial reflection and enhancing the brightness of an area luminescence equipment. Lighting equipment and area luminescence equipment using such optical laminated bodies are also provided.

SUMMARY OF THE INVENTION

In one aspect, the present invention provides an optical laminated body comprising:
a polarizing layer,
a first transparent film disposed closely to a front surface of the polarizing layer, and
a second transparent film disposed closely to a back surface of the polarizing layer, characterized in that the polarizing layer comprises a reflective polarizing film, and both of the first transparent film and the second transparent film are diffusive films.

According to a second aspect of the invention, there is provided a lighting equipment that illuminates an illuminating body, characterized in that the lighting equipment comprises:
(A) the optical laminated body as above-described, and
(B) a surface light source supplying light to the optical laminated body through a light-entrancing surface (an opposite surface to a surface contacting closely to the polarizing layer) of the first transparent film of the optical laminated body, According to a third aspect of the invention, there is provided an area luminescence equipment comprising the lighting equipment as described above, and a transparent illuminating body illuminated thereby from back surface of the illuminating body,
characterized in that there is no diffusive plate disposed between the lighting equipment and the illuminating body.

The optical laminated bodies of the present invention are characterized in that a polarizing layer comprises a reflective polarizing film, and both of a first transparent film disposed closely to a front surface of the polarizing layer and a second transparent film disposed closely to a back surface of the polarizing layer are diffusive films. Since the optical laminated bodies comprise diffusive films, an upper diffusive plate and/or a lower diffusive plate of the prior art are not required when the bodies are incorporated into the area luminescence equipment. Accordingly, the number of parts can be reduced, making it possible to simplify the manufacturing and assembly operations. The area luminescence equipment of the invention can also eliminate the optical surface between the diffusive plate and optical film. Accordingly, the optical loss by the interfacial reflection can be prevented, making it possible to facilitate an increase in brightness of the area luminescence equipment. By the effect of the diffusive film closely disposed to the polarizing layer, it is therefore possible to improve brightness without negatively or adversely influencing on the visual property.

The optical laminated bodies of the present invention are particularly useful for forming lighting equipment having the construction described above. The lighting equipment of the invention can provide the area luminescence equipment having the effect described above by using the lighting equipment in combination with the illuminating body.

DETAILED DESCRIPTION OF PREFERRED EMBODIMENT

The present invention will be further described by way of its preferred embodiments.

Polarizing Layer

Figure 1:
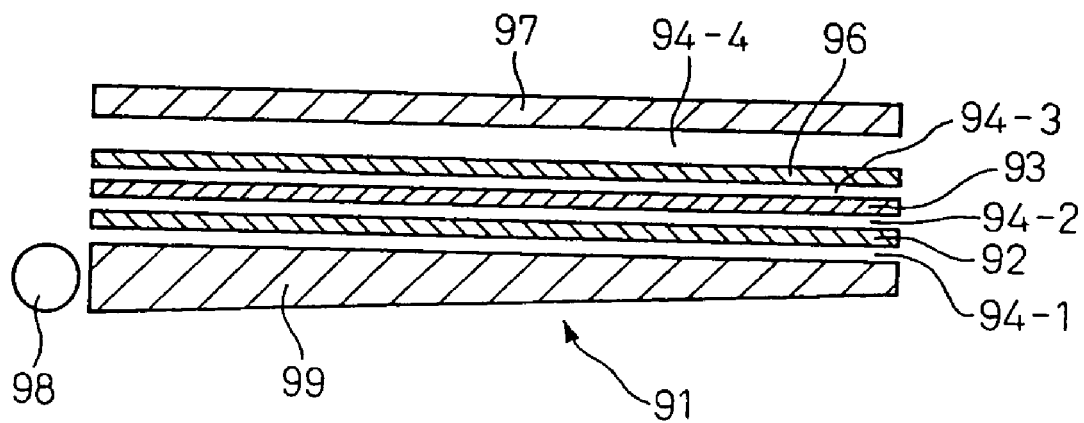
FIG. 1 is a cross-sectional view schematically showing a conventional area luminescence equipment.
Figure 2:
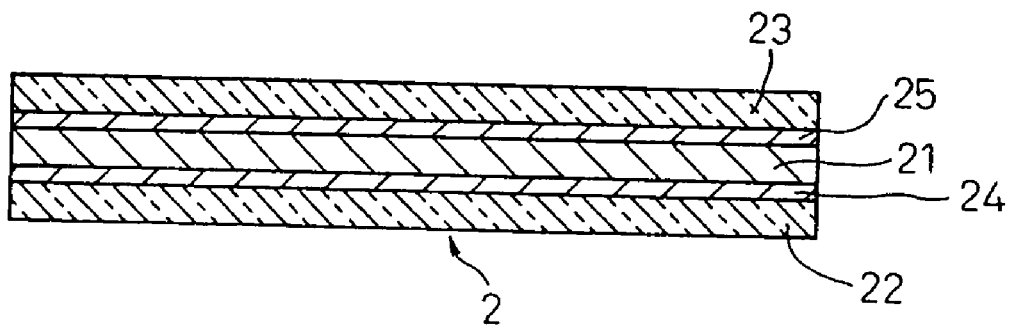
FIG. 2 is a cross-sectional view schematically showing one embodiment of an optical laminated body according to the present invention.

In the optical laminated bodies of the present invention, as shown in FIG. 2, first and second transparent films 22, 23 each made of a diffusive film are disposed to a front and back surface so as to sandwich a polarizing layer 21, the diffusive films are formed in close contact with the polarizing layer 21.

In the present invention, the polarizing layer comprises a reflection type polarizing film. The reflection type polarizing film is usually a polarizing film capable of transmitting only light in an oscillation direction in parallel to one intrafacial axis (transmission axis) and reflecting other light. That is, it exerts a polarizing action by transmitting only a light component in the oscillation direction in parallel to the above transmission axis among light incident to the polarizing film. However, light which does not penetrate the polarizing film is not substantially absorbed by the polarizing film, unlike a conventional light absorbing type polarizing plate. Accordingly, it is possible to return light reflected once by the polarizing film toward the polarizing layer again by a reflection element contained in the surface light source after returning (reflecting) to the surface light source side. Among light returned to the polarizing layer, the polarizing layer transmits only the light component in the oscillation direction in parallel to the above transmission axis and reflects the rest. That is, in the polarizing layer including a reflection type polarizing film, the intensity of the transmitted-polarized light can be enhanced by repeating such a transmission-reflection action. Accordingly, the brightness of the illuminating body by the polarized-light can be effectively enhanced. At this time, if the illuminating body is a transparent body (e.g. liquid crystal panel, etc.), the brightness of the illuminating body is effectively enhanced.

The reflection type polarizing film is usually a dielectric reflective film comprising a plurality of dielectric layers. As such a dielectric reflective film, for example, a multi-layer film disclosed in International Patent Publication (Kohyo) No. 9-507308 can be preferably used.

For example, a dielectric layer comprises a first group dielectric unit composed of a plurality of layers made of a first polymer and a second group dielectric unit composed of a plurality of layers made of a second polymer having a refractive index different from that of the first polymer in combination. In that case, the first and second group dielectric units are used in combination by alternatively laminating the layer made of the first polymer and the layer made of the second polymer and at least one of the first and second group dielectric units comprises a one-fourth wavelength layer wherein the product (n·d) of thickness (d, unit: nm) and refractive index (n) of the polymer is one-fourth of the wavelength of the reflected light. As such, when any one of the first and second polymers has optical anisotropy in the light-receiving surface (for example, when any one layer is monoaxially stretched), such a dielectric reflective film serves as a reflective film having a polarizing action. Usually, the reflected light is also visible light.

In the dielectric reflective film as described above, the reflectance of the above reflected light is usually not less than 70%, preferably not less than 80%, and particularly preferably not less than 90%. The transmittance of the transmitted light is usually not less than 60%, preferably not less than 70%, and particularly preferably not less than 80%. The terms "reflectance" and "transmittance" in the present specification are values measured using a spectrophotometer.

The reflection type polarizing film is usually made by alternatively laminating (ABAB . . . ) two different kinds of polymers (A and B). In a multi-layer film (ABAB . . . ) comprising two kinds of these polymers, one polymer is stretched (e.g. stretching ratio: about 5:1) along one axis (X-axis) but is not substantially stretched (1:1) along the other axis (Y-axis intersected perpendicularly to X-axis). Hereinafter, this X-axis is referred to as a "stretching direction" and the Y-axis is referred to as a "lateral direction".

As one polymer (B), those having an apparent refractive index whose value is not substantially changed by the stretching process (optically anisotropic) are preferred. As the other polymer (A), those having a refractive index whose value is changed by the stretching process are preferred. For example, a monoaxially-stretched sheet of the polymer (A) has a first refractive index larger than the apparent refractive index of the polymer (B) in the stretching direction, and has a second refractive index which is almost the same as the apparent refractive index of the polymer (B) in the lateral direction.

In the multi-layer polymer film (ABAB . . . ), the refractive index of the intrafacial axis (axis parallel to the surface of the film) is defined as an effective refractive index to the surface-polarized incident light, and this polarized surface is parallel to the above intrafacial surface. Accordingly, after stretching, the multi-layer film (ABAB . . . ) has a large difference in interlayer refractive index, but the interlayer refractive indexes are substantially the same in the lateral direction. This multi-layer film serves as a reflection type (reflection type) polarizing film which propagates a polarizing component of the incident light. The Y-axis is defined as a propagation (transmission) axis and light penetrating the reflection type polarizing film has a first oscillation direction.

On the other hand, light which does not penetrate the reflection type polarizing film is polarizing film having a second oscillation direction intersected perpendicular (at right angles) to the first oscillation direction. The polarized light having the second oscillation direction is incident upon the surface of the film along the X-axis and is reflected by an action of the difference in interlayer refractive index. Accordingly, the X-axis is defined as a reflection axis. In this respect, the reflection type polarizing film transmits only light having a selected oscillation direction (or polarizing direction).

The number of the polymer layers in the above polarizing film may be selected as small as possible to obtain desired optical characteristics. In the polarizing film, the number of the layers is typically less than 10,000, preferably less than 5,000, and more preferably less than 3,000. In addition, the thickness of the polarizing film is usually from 15 to 1,000 μm.

The above polymer is not specifically limited to transparent polymers. The polymer includes, for example, polycarbonate, acrylic resin, polyester, epoxy resin, polyurethane, polyamide, polyolefin, silicone (including modified silicone such as silicone polyurea, etc.) or the like.

The polarizing film usually has a smooth surface, but can be provided with an irregular surface as far as the effect of the present invention is not adversely affected. In this case, the convex portion can be formed by a matting or embossing treatment so as to afford the same effect as that of the diffusive film. In this case, the outer-most layer of the polarizing film can also be regarded as the diffusive film by eliminating the separate diffusive film disposed closely to this surface.

The number of polarizing films included in the polarizing layer is usually one, but a plurality of films can also be included. Furthermore, a film or layer other than the polarizing film may be included as far as the effect of the present invention is not adversely affected. The film or layer includes, for example, a surface protective layer, antistatic layer, transparent supporting layer (for the purpose of enhancing its strength), magnetic shield layer, adhesive layer, primer layer and the like. The thickness of the entire polarizing layer should be selected so that the resulting optical laminated body does not become bulky, and is usually from 5 to 2,000 μm.

First and Second Light Transparent Film

The light transparent film used in the present invention is a diffusive film having a diffuse transmission property. Such a diffusive film is usually a film where the surface of the polymer film is subjected to a diffusion surface treatment by matting or embossing. It can also be formed by subjecting the surface to the other diffusion surface treatment such as sandblasting or arrangement of a plurality of micro-projections. Furthermore, diffusive particles can also be contained by diffusing therein as far as the effect of the present invention is not adversely affected.

The first and second transparent films (i.e. first and second diffusive films) may be the same or different. For example, a diffusive film wherein at least one surface (principal surface) is subjected to a diffusion surface treatment is used as the first and second diffusive films and, furthermore, one diffusive film is closely disposed to the surface of the polarizing layer so that a light-entrancing-surface (an opposite surface to a surface contacting closely to the polarizing layer) of the first transparent film becomes a diffused surface, while the other diffusive film is closely disposed to the back surface of the polarizing layer so that a light emitting surface (an opposite surface to a surface contacting closely to the polarizing layer) of the second transparent film becomes a diffused surface.

The diffusive surface can be formed, for example, by using a resin composition comprising a resin such as a polycarbonate resin, acrylic resin, polyester resin, epoxy resin, polyurethane resin, polyamide resin, polyolefin resin, silicone resin (including modified silicone such as silicone polyurea) or the like.

The diffusive film is preferably a film subjected to a diffusion surface treatment. In this case, transmission loss by absorption in the diffusive film can be effectively prevented and it becomes easier to enhance the illuminance or brightness of the illuminating body. For example, the transmittance of the film before subjecting to the diffusion surface treatment (i.e. material itself of the diffusive film) is usually not less than 85%, preferably not less than 90%, and particularly preferably not less than 95%.

The diffusion performance of the diffusive film is not specifically limited as far as the effect of the present invention is not adversely affected. For example, the haze of the diffusive film is usually from 40 to 90%, preferably from 45 to 87%, and particularly preferably from 50 to 85%. "Haze" is a value measured by using a haze mater in accordance with JIS K7105 6.4. The roughness (Ra: centerline average roughness) of the diffused surface is usually less than 30 μm, and preferably not more than 20 μm.

The transparent film may be colored. The transparent film may also include a film or layer other than the diffusive film, and may have a diffusion property entirely. Such a film or layer can include, for example, a surface protective layer, antistatic layer, to transparent supporting layer (for the purpose of enhancing its strength), magnetic shield layer, adhesive layer, primer layer or the like.

Optical Laminated Body

As shown in FIG. 2, means 24, 25 for disposing first and second diffusive films 22, 23 closely to a polarizing film 21, can include a close contact layer containing an adhesive.

As the adhesive, for example, a pressure-sensitive adhesive, heat-sensitive adhesive (including hot melt), solvent-volatile adhesive or the like can be used. A curing type adhesive is preferred. It becomes easy to provide an optical laminated body having high heat stability (heat shrinkage and heat deformation occur hardly) by disposing two transparent films closely to the surface and back surface of the polarizing layer and curing the adhesive. Since the multilayer film (polarizing film) has physical properties such as linear expansion coefficient, and anisotropy, surface waviness can be caused by an external heat effect such as heat shock. Accordingly, usage of a curing type adhesive as a means for disposing a transparent film closely to a polarizing layer is particularly preferred.

In the curing of the adhesive, a conventional means such as heat, moisture, electron beam, ultraviolet light, or the like can be employed. However, an ultraviolet-curing type adhesive is preferred. In the heat curing and electron beam curing, a comparatively large amount of heat can be generated and the polarizing film and/or diffusive film can be thermally damaged by deformation. In the case of moisture curing and room temperature curing, it can become difficult to enhance the productivity of the optical laminated body because the curing time is comparatively long. In the case of the ultraviolet-curing type adhesive, the curing time is comparatively short and the energy generated on a curing treatment is comparatively small.

The material of the adhesive is not specifically limited. For example, a composition comprising a resin such as acrylic resin, polyester resin, epoxy resin, polyurethane resin, polyolefin resin, silicone resin, silicone polyurea or the like can be used. In the case of a curing type adhesive, the above resin composition can contain a curing (reactive) monomer and/or oligomer.

The adhesive is usually disposed on the close contact surface (adhesive surface) of the polarizing layer or transparent film in the form of a close contact layer (i.e. adhesive 0 layer). The thickness of the close contact layer is usually from 5 to 200 μm. The transmittance of the adhesive is not specifically limited, but is usually not less than 60%, preferably not less than 70%, and particularly preferably not less than 80%.

As the material of the above close contact layer, those other than the adhesive can be used. For example, it is possible to dispose closely, optically, using a close contact layer containing a rubber or elastomer (whose adhesive strength is smaller than that of a general adhesive) so that an optical interface is not formed between the transparent film and polarizing layer. As far as the brightness-increasing effect is not adversely affected, the close contact layer can not be disposed to contact the transparent film closely to the polarizing layer. For example, the transparent film and polarizing film may also be closely contacted so that an air layer is not present substantially by smoothing the close contact surface between them.

The optically laminated body is usually disposed so as not to contact optically with the light source. For example, when the light source is a surface light source, the optically laminated body is merely laminated on the light emitting surface of the surface light source or laminated thereon through a spacer (e.g. bar or wire having a surface area smaller than the area of the light emitting surface). As far as the brightness-increasing effect is not adversely affected, it can also be disposed through the diffusive film. However, in order to effectively reduce the number of parts to be incorporated, it is preferably laminated merely on the light emitting surface of the light source through no spacer or diffusive film. Accordingly, the diffusive film in contact with the light source of the optical laminated body is preferably formed by subjecting to a diffusion surface treatment such as embossing, matting or the like.

Lightening Equipment

The lightening equipment of the present invention comprises (A) the optical laminated body, and (B) the surface light source supplying light to the optical laminated body, through a light-entrancing-surface (an opposite surface to a surface contacting closely to the polarizing layer) of the first transparent film. The light illuminating the illuminating body is diffused-polarized light which is typically supplied from the above surface light source and emitted from a light emitting surface (an opposite surface to a surface contacting closely to the polarizing layer) of the second transparent film through the optical laminated body.

The illuminating body can include a display body, such as a liquid crystal panel, a personal computer monitor or a television set, or an adjustable display type billboard or signboard. When the liquid crystal panel is a transparent type one and the illuminating body is transparent, the illuminating body is illuminated by a lightening equipment from the back surface of the illuminating body and can be visually recognized from the front surface. In addition, an area luminescence equipment formed by using such a back light equipment in combination with the liquid crystal display body is usually a personal computer monitor, which also is a type of liquid crystal display equipment. Such a liquid crystal display equipment (area luminescence equipment) can effectively enhance the brightness of the liquid crystal image surface by the action of the above optical laminated body and, at the same time, it can reduce the number of parts of the equipment, thereby making it possible to simplify an operation of incorporating parts in production.

Figure 3:
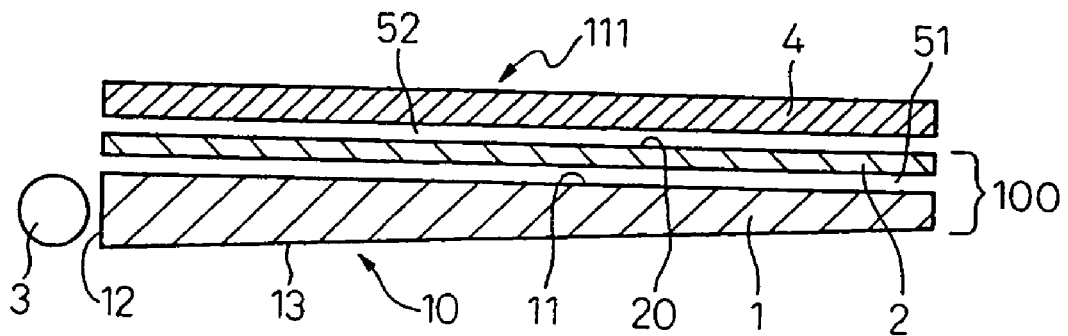
FIG. 3 is a cross-sectional view schematically showing one embodiment of an area luminescence equipment according to the present invention.

Referring to FIG. 3, lightening equipment 100 of the invention can be formed by disposing an optical laminated body 2 on one principal surface (light emitting surface) 11 of a light guiding plate 1. On at least one end 12 (end in a direction crossing the above principal surface) of the light guiding plate 1, a linear light source 3 is disposed. On the other principal surface 13 of the light guiding plate 1, a plurality of diffusing points (not shown) by dot printing of a light diffusive substance is usually formed. Furthermore, a reflective member (not shown) is disposed to substantially cover the whole other principal surface 13. This reflective member is, for example, a white opaque diffuse reflective sheet or a mirror finished reflective sheet. The mirror finished reflective sheet includes those wherein a metal layer is disposed on the surface of a polymer film and a dielectric reflective film containing no metal layer. The dielectric used in the dielectric reflective film is usually a polymer. With such a construction, light is introduced into the light guiding plate 1 from the light source 3, and can be converted into diffused light emitted uniformly from a light emitting surface 11 of the light guiding plate 1, thereby making it possible to effectively enhance illuminance. In this example, the portion composed of a combination of the above reflective member and light source 3 becomes a surface light source 10.

It is preferred that the optical laminated body 2 is disposed on the light emitting surface (light emitting surface 11 of the light guiding plate) of the surface light source 10 through an air layer 51. That is, these members are not closely contacted each other optically but are merely laminated or laminated through a spacer. Light is supplied to the optical laminated body 2 from the surface light source 10 through the air layer 51, thereby making it possible to effectively reduce light transmission loss due to light reflection in the optical interface formed by parts disposed between the surface light source and optical laminated body.

Light illuminating an illuminating body 4 is emitted from a light emitting surface 20 (light emitting surface of a second transparent film) of the optical laminated body 2, but is converted into diffused-polarized light by penetrating the polarizing layer of the optical laminated body 2 and penetrating two diffusive films.

Conventional light guiding plates and light sources can be used in the lighting equipment. For example, when the lightening equipment is used as a back-lightening equipment for liquid crystal panel, a transparent plate made of quartz, glass, resin (acrylic resin) or the like can be used as the light guiding plate, and a linear light source such as fluorescent tube, hot cathode, cold cathode, neon tubing or the like can be used as the light source. A combination of a side light extraction type light fiber and a light source for supplying light to the light fiber from the end portion of the light fiber can be used as the linear light source.

The thickness of the whole light guiding plate is usually from 0.1 to 30 mm, and preferably from 0.3 to 20 mm. In addition, the power of the light source is usually from 0.5 to 200 W, and preferably from 1 to 150 W. The shape of the light source is not specifically limited, and it is preferred that a reflective film and a reflector are usually disposed around the light emitting surface of the light source, thereby introducing substantially whole light from the light source into the light conductive plate.

One or more light sources may be included in the above constructions. For example, a light source can be disposed to both ends facing each other of the above light guiding plate. Using a light guiding member having a light guiding space in place of the light guiding plate, one or more light sources can also be disposed in the light guiding space. Furthermore, a sheet-like electroluminescence (EL) element can also be used as the surface light source.

A prism lens type brightness-increasing film (lens film) can also be disposed between the surface light source and optical laminated body as usual. For example, one or more lens films are disposed between the illuminating body and optical laminated body. As such, an increase in the brightness of the area luminescence equipment is further facilitated. When two lens films are disposed in such a manner, the longitudinal directions of respective prism lens are intersected perpendicularly to each other.

When using the optical laminated body of the present invention in combination with the lens film, one lens film can be added in place of elimination of two diffusive plates. In this case, the brightness can be effectively reduced without increasing the number of parts, though one lens film is preferably used to maximize the reduction of parts.

The prism surface of the lens film can be disposed to face the optical laminated body so that the lens film and optical laminated body are not optically closely contacted. Whereby the visual angle of the light emitting surface of the area luminescence equipment is reduced as small as possible and an increase in brightness is further enhanced. Specific examples of the lens film, which can be used in the present invention, include a brightness-increasing film; BEF™ series manufactured by 3M Co.

Area Luminescence Equipment

The area luminescence equipment of the invention generally comprise the above lighting equipment and a transparent illuminating body illuminated from the back surface of the illuminating body. In such equipment, light from the above surface light source can be converted into diffused-polarized light whose illuminance is effectively enhanced only by using the optical laminated body as the lightening equipment (without using the diffusive plate as described above). Since light from the lightening equipment can eliminate transmission loss due to the optical interfacial reflection formed by the diffusive plate, the brightness of the area luminescence equipment can be effectively enhanced. In addition, the effect of preventing visual recognition (visual recognition through the sled illuminating body) of a diffusing point included in the light guiding plate can be obtained by the effect of the first and second diffusive films included in the optical laminated body.

As shown in FIG. 3, the area luminescence equipment 111 of the invention, includes a transparent illuminating body 4, preferably disposed on an optical laminated body 2 of a lightening equipment 100 through an air layer 52. That is, these equipments are not closely contacted, optically, but are merely laminated or laminated through a spacer. Transmittance loss can be effectively reduced by supplying light to the illuminating body 4 from the lightening equipment 100 through the air layer.

The area luminescence equipment is completed by laminating the respective parts (e.g. illuminating body 4, optical laminated body 2, surface light source 10, optionally included lens film, etc.) so as not to contact closely optically, and integrally fixing the respective parts.

The transparent illuminating body is usually a liquid crystal panel (LCD). The LCD is illuminated from the back surface opposite to a surface (light emitting surface) on which a liquid crystal image is visually recognized. Almost all light which penetrates the LCD.

The optical laminated bodies of the present invention are useful as an optical film (or parts), which is used to effectively (with effectively reduce transmission loss) converting illuminating light from the lightening equipment into diffused-polarized light and to effectively enhance the intensity (illuminance as the lightening equipment). In the area luminescence equipment comprising the lightening equipment of the present invention and a transparent illuminating body including LCD, the intensity of the polarizing component penetrating LCD is effectively enhanced and the uniformity of the brightness of the light emitting surface can also be enhanced. It is possible to reduce the number of constituent parts of the area luminescence equipment, thereby making it possible to simplify an operation of incorporating parts.

EXAMPLES

The present invention will be described with reference to the following examples and comparative examples.

Example 1

An optical laminated body was made in the following manner. As a polarizing layer, a reflection type polarizing film (thickness: 130 μm) was used. As first and second transparent films, an embossed type diffusive film Yupiron™ FEM M01 (thickness: 130 μm, haze: 79%) manufactured by Mitsubishi Engineering Plastic Co. was used.

The above polarizing film was a multi-layer type dielectric reflection film. A first polymer layer of a first dielectric unit containing the polarizing film was monoaxially stretched, while a second polymer layer of a second dielectric unit was not stretched. In the case of the first polymer layer, the direction intersecting perpendicularly to the stretching direction is a transmission axis and the stretching direction is a reflection axis.

A transmittance to light having a wavelength of 550 nm in the transmission axis of the polarizing film was 85% and the average transmittance in the region ranging from 400 to 800 nm was about 85%. The transmittance of light having a wavelength of 550 nm in the reflection axis of the polarizing film was 95% and the average transmittance in the region ranging from 400 to 800 nm was about 95%.

The diffusive film was disposed closely to the front and back surfaces of the polarizing film using an ultraviolet-curing type adhesive. This ultraviolet-curing type adhesive contained an alkyl acrylate monomer and oligomer as a primary component. After the above three films were laminated to each other, the adhesive was cured, creating an optical laminated body with a thickness of about 430 μm. In making the polarizing film and diffusive film, no thermal damage or deformation such as surface waviness was observed.

Subsequently, a lighting equipment was made in the following manner. A 11.3 type edge-lighting back-light manufactured by Hitachi Corp. was used. As a surface light source, the back-light comprised a light guiding plate made of an acrylic resin characterized in that light is introduced into the light guiding plate from a fluorescent tube disposed at the end portion. In addition, a plurality of micro-diffusing points was disposed on the opposite surface to a light emitting surface and this surface was covered with a reflection plate.

The optical laminated body obtained was cut into a piece having the same planar size as that of the light emitting surface which was laminated on this light emitting surface, completing the lightening equipment. The light emitting surface of the surface light source and diffusive film surface (a light-entrancing-surface subjected to a diffusion treatment of the first transparent film) of the optical laminated body were not closely contacted, optionally, and a thin air layer was present.

Finally, a transparent liquid crystal panel (LCD) was laminated on the diffusive film surface (a light-entrancing-surface subjected to a diffusion treatment of the second transparent film) of the optical laminated body to make an area luminescence equipment. The LCD was a 11.3 type TFT LCD (whose color is normally white) manufactured by Hitachi Corp, and the lightening equipment and LCD were disposed so that a light transmission axis (a light transmission axis of a polarizing plate with a built-in CD) of LCD was parallel to that of the polarizing film of the optical laminated body. In addition, the light-entrancing-surface of the LCD and diffusive film surface (a light emitting surface subjected to a diffusion treatment of the second transparent film) were not closely contacted and a thin air layer was present.

Using the area luminescence equipment of this example, the brightness of the liquid crystal light emitting surface was measured. As a brightness measuring device, a brightness meter "EZ contrast 160D" manufactured by Eldim Co. was used. The brightness in the vicinity of the center of the light emitting surface of the area luminescence equipment of this example was 332 cd/cm$^2$.

Comparative Example 1

For comparison, an area luminescence equipment was made in the same manner as in Example 1, except that the above reflection type polarizing film was used in place of the optical laminated body and two diffusive plates (between the LCD and polarizing film and between the surface light source and polarizing film) were disposed without being disposed closely to the polarizing film. The diffusive plate used in Example 1 was used as a lower diffusive plate and a diffusive plate PCPT (haze: about 56%) manufactured by Tsujimoto Denki Co. was used as an upper diffusive plate. The brightness in the vicinity of the center of the light emitting surface of the area luminescence equipment was 309 cd/cm$^2$.

Comparative Test 1

The area luminescence equipment of Example 1 and Comparative Example 1 were compared. As a result, a diffusing point of the light guiding plate was not recognized from the liquid crystal surface of both pieces of area luminescence equipment. Furthermore, the visual properties of the equipment of Example 1 and Comparative Example 1 were almost the same. The results of the visual properties are shown in Table 1 below. An angle, whose brightness is reduced to half an axial brightness (visual angle: 0) in the direction in parallel to the transmission axis of the polarizing plate (ahorizontal direction) and the direction perpendicular to the direction (perpendicular direction) in the liquid crystal light emitting surface, was used as a visual angle.

According to the area luminescence equipment comprising the optical laminated body of the present invention, the brightness is effectively increased without deteriorating other characteristics such as visual property compared to those comprising a combination of a reflection type polarizing film and two diffusive plates disposed without being contacted closely with the reflection type polarizing film.

Example 2

An area luminescence equipment of this example was made in the same manner as in Example 1, except that one diffusive plate (the same diffusive plate as that used in Example 1), which is not contacted closely with the surface light source and optical laminated body, was used. Brightness was measured in the same manner as in Example 1, and was 336 cd/cm$^2$. A diffusing point of the light guiding plate was not visually recognized from the liquid crystal surface of the area luminescence equipment of this example. The results of the visual property of the area luminescence equipment of the example are shown in Table 1 below.

TABLE 1

| Visual angle in the case of using no lens film (reported in degrees): | | |
| --- | --- | --- |
| Example 1 No diffusive plate | Example 2 Lower diffusive film | Comparative Example 1 Upper/lower diffuse films |
| Horizontal direction | | |
| 59 | 53 | 58 |
| Perpendicular direction | | |
| 49 | 49 | 51 |

Example 3

An area luminescence equipment of this example was made in the same manner as in Example 1, except that one lens film having a plurality of parallel linear prism lens was disposed between the optical laminated body and surface light source. The brightness measured in the same manner as in Example 1 was 455 cd/cm$^2$.

In this example, the lens film was disposed such that the prism surface was contacted with the optical laminated body and that the lens film was not optically contacted with the light guiding plate of the surface light plate and optical laminated body. The lens film was a brightness-increasing film "BEF II 90/50" manufactured by 3M Co., and the lens film was disposed such that the longitudinal direction of the prism perpendicularly intersected a back-light fluorescent tube.

Comparative Example 2

For comparison, an area luminescence equipment of this example was made in the same manner as in Example 1, except that the above reflection type polarizing film was used in place of the optical laminated body and two diffusive plates were disposed, (that is, one diffusive plate was disposed between the polarizing film and light guiding plate and one diffusive plate was disposed between the lens film and liquid crystal panel). The brightness in the vicinity of the center of the light emitting surface of this area luminescence equipment was 382 cd/cm$^2$.

Comparative Test 2

The area luminescence equipments of Example 3 and Comparative Example 2 were compared. As a result, a diffusing point of the light guiding plate was not recognized from the liquid crystal surface of both pieces of area luminescence equipment. Furthermore, the visual properties of the area luminescence equipments of Example 3 and Comparative Example 2 were almost the same. The measurement results of the visual properties are shown in Table 2 below.

As is apparent from the above description, according to the area luminescence equipment comprising the optical laminated body of the present invention, the brightness is effectively increased without deteriorating other characteristics such as visual property compared with those comprising a combination of a reflection type polarizing film and two diffusive plates disposed without being contacted closely with the reflection type polarizing film.

Comparative Example 3

An area luminescence equipment of this example was made in the same manner as in Comparative Example 2, except that the upper diffusive plate was not used. The brightness, measured in the same manner as in Example 1, was 428 cd/cm$^2$. The measurement results of the visual property of the area luminescence equipment of this example are also shown in Table 2 below.

TABLE 2

| Visual angle in the case of using one lens film (reported in degrees): | | |
| --- | --- | --- |
| Example 3 No diffusive plate | Comparative Example 2 Upper/lower diffusive films | Comparative Example 31 Lower diffuse film |
| Horizontal direction 48 | 49 | 50 |

TABLE 2-continued

Visual angle in the case of using one lens film (reported in degrees):

|  | Example 3 No diffusive plate | Comparative Example 2 Upper/lower diffusive films | Comparative Example 31 Lower diffuse film |
|---|---|---|---|
| Perpendicular direction | 37 | 35 | 35 |

Example 4

An area luminescence equipment of this example was made in the same manner as in Example 1, except that two lens films having a plurality of parallel linear prism lens was disposed between the optical laminated body and surface light source. The brightness measured in the same manner as in Example 1 was 556 cd/cm².

In this example, two lens films were disposed such that the prism surface faced the optical laminated body side and the lens film was not closely optically contacted with the light guiding plate of the surface light plate and optical laminated body. In addition, two to lens films were not closely optically contacted.

The longitudinal directions of the prism of two lens films intersected perpendicularly each other and the longitudinal direction of the prism of the lens film at the side closed to the optical laminated body intersected perpendicularly to the back-light. The lens films were the same as that used in Example 3.

Comparative Example 4

For comparison, an area luminescence equipment of this example was made in the same manner as in Example 4 (two prisms), except that the above reflection type polarizing film was used in place of the optical laminated body and that two diffusive plates were employed, (that is, one diffusive plate was disposed between the polarizing film and light guiding plate and one diffusive plate was disposed between the lens film and liquid crystal panel). The brightness in the vicinity of the center of the light emitting surface of this area luminescence equipment was 411 cd/cm².

Comparative Test 3

The area luminescence equipments of Example 4 and Comparative Example 4 were compared. As a result, a diffusing point of the light guiding plate was not recognized from the liquid crystal surface of both of area luminescence equipments. Furthermore, the visual properties of the area luminescence equipments of Example 4 and Comparative Example 4 were almost the same. The measurement results of the visual properties are shown in Table 3 below.

As is apparent from the above description, according to the area luminescence equipment comprising the optical laminated body of the present invention, the brightness is effectively increased without deteriorating other characteristics such as visual property compared to those comprising a combination of a reflection type polarizing film and two diffusive plates disposed without being contacted closely with the reflection type polarizing film.

Example 5

An area luminescence equipment of the example of the present invention was made in the same manner as in Example 4, except that one diffusive plate (the same diffusive plate as that used in Example 1), which is not closely contacted with the surface light source and optical laminated body, was disposed between the surface light source and optical laminated body (lower position). The brightness, measured in the same manner as in Example 4, was 433 cd/cm². A diffusing point of the light guiding plate could not be visually recognized from the liquid crystal surface of the area luminescence equipment of this example. The measurement results of the visual property of the area luminescence equipment of this example are shown in Table 3 below.

TABLE 3

Visual angle in the case of using two lens film (reported in degrees):

|  | Example 4 No diffusive plate | Example 5 Lower diffusive film | Comparative Example 4 Upper/lower diffuse films |
|---|---|---|---|
| Horizontal direction | 30 | 30 | 31 |
| Perpendicular direction | 28 | 28 | 28 |

Comparative Example 5

An area luminescence equipment of this example was made in the same manner as in Comparative Example 4, except that an upper diffusive plate was not used. The brightness, measured in the same manner as in Example 1, was 469 cd/cm².

What is claimed is:

1. A lighting device comprising:
   (A) An optical laminated body comprising
      (i) a polarizing layer,
      (ii) a first transparent film disposed closely to a front surface of the polarizing layer, and
      (iii) a second transparent film disposed closely to a back surface of the polarizing layer, wherein the polarizing layer comprises a reflective polarizing film, and both of the first transparent film and the second transparent film are diffusive films,
   (B) a light source supplying light to the optical laminated body through a light entry surface of the first transparent film of the optical laminated body, and
   (C) a lens film disposed between the light source and the optical laminated body,
   the lighting device providing diffused-polarized light emitted from a light emitting surface of the second transparent film of the laminated body.

2. An area luminescence device comprising the lighting device of claim 1 and a transparent optical body illuminated by the lighting device from a back surface of the optical body.

3. The area luminescence device of claim 2, wherein the optical body comprises a LCD panel.

4. The area luminescence device of claim 2, wherein there is no diffusive plate disposed between the lighting device aid the optical body.

* * * * *

UNITED STATES PATENT AND TRADEMARK OFFICE
CERTIFICATE OF CORRECTION

PATENT NO. : 6,972,813 B1
DATED : December 6, 2005
INVENTOR(S) : Toyooka, Kazuhiko It is certified that error appears in the above-identified patent and that said Letters Patent is hereby corrected as shown below:

Title page,
Item [56], References Cited, FOREIGN PATENT DOCUMENTS, delete "0 545 701 A1" and insert -- 0 545 705 A1 --; and delete "6/1997" and insert -- 8/1997 --.

Column 5,
Line 60, after "layer," delete "to".

Column 6,
Line 38, delete "0" before "layer).".

Column 9,
Line 11, after "the" delete "sled".

Column 13,
Line 27, after "two" delete "to".

Column 14,
Line 39, delete "An" and insert -- an --.
Line 61, delete "a" and insert -- an --.
Line 63, delete "aid" and insert -- and --.

Signed and Sealed this

Fourteenth Day of March, 2006

JON W. DUDAS
*Director of the United States Patent and Trademark Office*